D. HOGUE.
FUNNEL.
APPLICATION FILED AUG. 15, 1910.
1,055,534.
Patented Mar. 11, 1913.
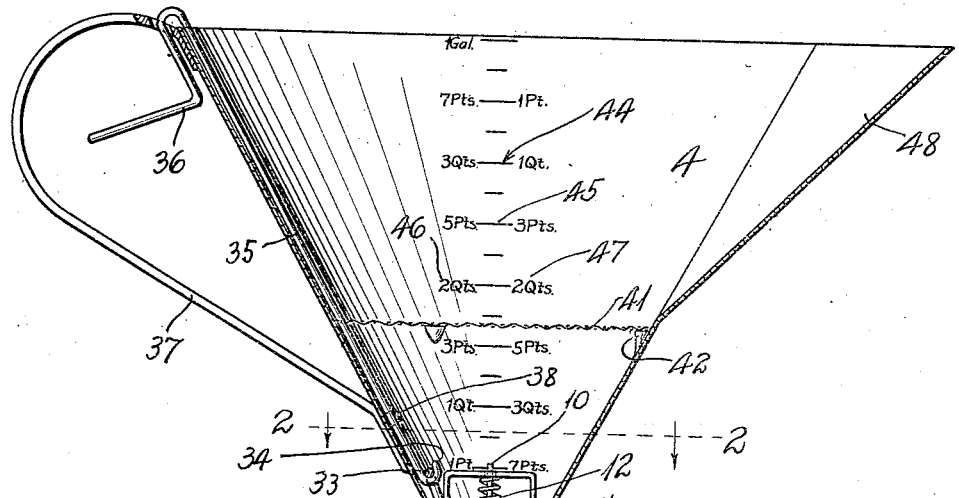
Witnesses.
E. R. Pollard
F. D. Ammen
Inventor.
Dellavergne Hogue.
By Howard Strause
Attys.

UNITED STATES PATENT OFFICE.

DELLAVERGNE HOGUE, OF LOS ANGELES, CALIFORNIA.

FUNNEL.

1,055,534.        Specification of Letters Patent.    Patented Mar. 11, 1913.

Application filed August 15, 1910. Serial No. 577,329.

*To all whom it may concern:*

Be it known that I, DELLAVERGNE HOGUE, a citizen of the United States, residing at Los Angeles, in the county of Los Angeles, in the State of California, have invented new and useful Improvements in Funnels, of which the following is a specification.

This invention relates to funnels such as used in filling large vessels.
The object of the invention is to produce a funnel which will close automatically when the vessel which is being supplied by the funnel is practically full.

A further object of the invention is to construct the valve and the valve operating mechanism in a simple manner.

In the drawings forming a part of the annexed specification, Figure 1 is a vertical central section through a funnel constructed according to my invention and showing the valve of the funnel in its closed position. Fig. 2 is a horizontal section taken on the line 2—2 of Fig. 1 and upon an enlarged scale. Fig. 3 is a vertical central section taken through the lower portion of the funnel and showing the valve in its raised position, certain parts being broken away and shown partly in elevation.

Referring more particularly to the parts, 4 represents the body of the funnel which is of the usual conical form, being provided at its lower end with a downwardly extending housing 5 and within the housing there is formed a transverse head, 6; and above this point a transverse wall or bottom 7 is formed in the funnel near the point of juncture between the body thereof and the housing. This head 7 forms the bottom of the funnel and is formed with an opening having a beveled edge forming a seat 8 for the valve disk 9. This valve disk is formed with a guide stem 10, which extends upwardly therefrom, and passes through the horizontal member of a guide yoke 11 which straddles the lower portion of the funnel as indicated in Fig. 1. Between this yoke 11 and the upper side of the valve 9 a coiled spring 12 is provided around the guide stem, which tends to hold the valve upon its seat.
On the under side of the bottom head 7 a similar transverse yoke 13 is formed having a horizontal member with a guide opening 14 through which passes a lower guide stem 15 which extends down from the center of the valve and in line with the stem 10.

From the under side of the yoke 13 a post 16 extends downwardly and on this post 16 a trip lever 17 is pivotally mounted, the free end of said trip lever being formed with a rest 18, which is adapted to be engaged by an upwardly turned toe 19, said toe being formed on a trigger 22 which is pivotally mounted at 20 on a post 21 similar to the post 16 which projects downwardly from the guide yoke 13. This trigger 22 has an arm which normally inclines downwardly across the axis of the funnel and the lower edge of this arm rests on a pin 23ª projecting from the side of releasing lever 23, which releasing lever is pivotally mounted at 24 on a post 25 which extends downwardly from the yoke 13 as indicated. The free end of this releasing lever is bent slightly and formed with a cam end or toe 26 normally resting against a head 27 which is formed on the upper end of an adjusting stem 28, said adjusting stem passing freely upwardly through the head 6 and having a buoyant float 29 attached to the lower end thereof as shown. This float 29 substantially fills the lower part of the housing 5, and in the housing above the float and below the head 6 a plurality of vents 30 are formed, admitting air to the space under the head 6 as will be readily understood.

As shown most clearly in Fig. 2, the disk 9 is provided on opposite sides with radially projecting fingers 31. Under these fingers the ends of forks 32 extend, said forks being connected integrally with each other by a loop 33 to form a yoke. This loop 33 is engaged by a hook 34 which is formed on the lower end of the rod 35 which extends up the inner side of the funnel wall and is bent over so as to form an arm 36 in the opening of the handle 37. On the inner side of the body of the funnel a guide 38 is placed through which the rod 35 slides freely as indicated.

The wall of the housing just above the head 6 is formed with large openings 39 which permit the liquid to pass out of the funnel in a downward direction without passing through the lower end of the housing. It should be understood that if the arm 36 is pulled upwardly the slide bar 35 will be pulled upwardly and will pull the forks 32 upwardly so as to raise the valve disk by reason of the fingers 31. The upward or lifting movement of the forks 32 is limited however, by upwardly projecting toes 40 which are formed at the ends thereof as indicated most clearly in Fig. 1. These toes prevent the forks from becoming disengaged from the valve.

At an intermediate height within the body of the funnel a transverse web 41 of wire gauze or similar material is placed, which operates as a strainer, said strainer being removable, and being supported upon lugs 42 which project in from the wall of the funnel, as indicated.

In order to insure that the disk 9 will seat tight its face is provided with a packing ring 43 as indicated most clearly in Fig. 3. When the disk is released by pulling up on the rod 35 the trip lever 17 will be pulled upwardly and the spring 12 will be slightly compressed. When the trip lever 17 moves upwardly the toe 19 on the trigger 22 will come under the rest 18, and the point of application of the pressure by the trip lever on the trigger 22 is so near the pivot 20 that it affords little tendency to rotate the trigger. Furthermore it will be seen that the releasing lever 23 inclines downwardly and inwardly so as to engage the centrally mounted stem 28 and yet be capable of operating the trigger arm 22 which can thus be accommodated within the walls of the ordinary funnel. The upper curved end of the trigger 22 when holding the valve open is brought into almost vertical position over its pivot point so that the parts are raised nearly in equilibrium, and the float can readily trip the trigger by engaging the said lever 23.

In using the funnel when the liquid in the vessel which is being filled reaches the float 29, the float moves upwardly and forces the releasing lever 23 upwardly. This moves the trigger 22 and disengages the toe 19 from the seat 18. This permits the spring 12 to thrust the valve downwardly upon its seat.

On the interior of the wall of the funnel is provided a graduated scale 44 having horizontal marks 45, and on the left ends of these marks a row 46 of numbers is provided which indicates the amount of liquid which the funnel will hold at that mark and on the opposite ends of the lines a similar row 47 of numbers is provided which indicates the amount of liquid which has run from the funnel. The total capacity of the funnel being one gallon. In this way two complementary scales are provided on the same division lines, one of which indicates the contents of the funnel at that point, while the other indicates the remaining amount necessary to fill the funnel.

In using the funnel it should be understood that with the valve on its seat a quantity of liquid is poured into the funnel to any depth and the reading of the row of numbers 46 is taken so as to take account of the quantity in the funnel. Then the arm 36 will be pulled upwardly so as to raise the valve and permit the funnel to empty itself into the vessel which is being filled. A slight raising of the valve will unseat it so that this operation of filling and emptying the funnel may be repeated again and again until the vessel is full. Opposite the handle 37 a pouring spout 48 is provided.

Special attention is called to the air vents 30, and to their function in permitting the escape of the air above the float 29 when it rises. For this reason the float is perfectly free to rise by its buoyancy when the level of the liquid in the vessel being filled rises to the predetermined point.

What I claim is:—

1. A funnel having a bottom, a valve in said bottom, said valve having fingers on opposite sides thereof, a yoke having forks engaging said fingers and adapted to raise said valve from its seat when said yoke is pulled upwardly, a rod extending down the inner side of said funnel from above and engaging said yoke to raise said valve, mechanism under said valve for holding the same raised above its seat, and a float for controlling said mechanism.

2. A funnel having a valve seat mounted therein near its contracted end, a valve adapted to engage said seat for preventing the discharge of liquids from the funnel, a spring normally tending to close said valve, a lever connected with the valve, a trigger arranged transversely in the neck of the funnel and having a curved end portion adapted to be brought almost in vertical alinement with its pivotal point for holding the valve open against the action of the spring, the said curved end portion engaging the said lever, and a return lever pivoted near one wall of the funnel neck and extending inwardly toward the axis of the funnel, said lever being adapted to engage the under end of the trigger for distributing its equilibrium, and a float adapted to raise said return lever.

In witness that I claim the foregoing I have hereunto subscribed my name this 8th day of August, 1910.

DELLAVERGNE HOGUE.

Witnesses:
F. D. AMMEN,
EARLE R. POLLARD.

---

Copies of this patent may be obtained for five cents each, by addressing the "Commissioner of Patents, Washington, D. C."